(12) United States Patent
Zhu et al.

(10) Patent No.: US 11,097,218 B2
(45) Date of Patent: Aug. 24, 2021

(54) FLUE GAS PURIFICATION TOWER

(71) Applicant: INSTITUTE OF PROCESS ENGINEERING, CHINESE ACADEMY OF SCIENCES, Haidian District (CN)

(72) Inventors: Tingyu Zhu, Haidian District (CN); Yuran Li, Haidian District (CN); Shuai Zhang, Haidian District (CN); Wen Liu, Haidian District (CN)

(73) Assignee: INSTITUTE OF PROCESS ENGINEERING, CHINESE ACADEMY OF SCIENCES, Beijing (CN)

( * ) Notice: Subject to any disclaimer, the term of this patent is extended or adjusted under 35 U.S.C. 154(b) by 222 days.

(21) Appl. No.: 16/346,885

(22) PCT Filed: Nov. 23, 2016

(86) PCT No.: PCT/CN2016/106852
§ 371 (c)(1),
(2) Date: May 2, 2019

(87) PCT Pub. No.: WO2018/094588
PCT Pub. Date: May 31, 2018

(65) Prior Publication Data
US 2020/0054984 A1  Feb. 20, 2020

(51) Int. Cl.
*B01D 53/04* (2006.01)
*B01D 53/74* (2006.01)
*B01D 53/88* (2006.01)

(52) U.S. Cl.
CPC ..... *B01D 53/0423* (2013.01); *B01D 53/0446* (2013.01); *B01D 53/74* (2013.01);
(Continued)

(58) Field of Classification Search
CPC ............ B01F 3/04; B01D 53/88; B01D 53/74
See application file for complete search history.

(56) References Cited

U.S. PATENT DOCUMENTS 5,234,672 A   8/1993  Ruscheweyh

FOREIGN PATENT DOCUMENTS

| CN | 101765950 | 7/2010 |
|---|---|---|
| CN | 203507792 | 4/2014 |

(Continued)

OTHER PUBLICATIONS

Office Action issued in related JP2019-547744 dated Jun. 23, 2020.
(Continued)

*Primary Examiner* — Robert A Hopkins
(74) *Attorney, Agent, or Firm* — Woodard, Emhardt, Henry, Reeves & Wagner, LLP

(57) ABSTRACT

Disclosed is a flue gas purification tower, comprising a tower body, at least one gas inlet (1) disposed at the bottom of the tower body, at least one gas outlet (2) disposed at the top of the tower body, at least one active coke layer (3) located inside the tower body, and a baffle plate (4) arranged in a place where the flow direction of the flue gas from the gas inlet changes. The baffle plate (4) is a straight plate, an arc plate, a straight-and-arc plate or a straight-arc-straight plate, wherein the straight-and-arc plate comprises a straight segment and an arc segment connected with each other; and the straight-arc-straight plate comprises a straight segment in the vertical direction, a straight segment in the horizontal direction, and an arc segment connected between the two straight segments.

7 Claims, 3 Drawing Sheets

(52) U.S. Cl.
CPC ........ B01D 53/88 (2013.01); *B01D 2253/102* (2013.01); *B01D 2257/302* (2013.01); *B01D 2257/404* (2013.01)

(56) References Cited

FOREIGN PATENT DOCUMENTS

| | | | |
|---|---|---|---|
| CN | 104190244 A | * 12/2014 | ............. B01D 53/83 |
| CN | 205216471 | 5/2016 | |
| CN | 105749741 | 7/2016 | |
| CN | 105749748 | 7/2016 | |
| CN | 205659562 | 10/2016 | |
| EP | 1 799 331 | 6/2007 | |
| JP | 2005152719 | 6/2005 | |
| WO | WO 2006/032288 | 3/2006 | |

OTHER PUBLICATIONS

Office Action issued in related JP2019-547744 dated Feb. 16, 2021.

* cited by examiner

FLUE GAS PURIFICATION TOWER

TECHNICAL FIELD

The present invention relates to the technical field of flue gas purification equipments, in particular to a flue gas purification tower.

BACKGROUND

With the rapid development of the economy, the environmental problems brought about by resource-based production have become more and more serious. Among them, the flue gas released from power plants, steel mills, coking plants, and glass-ceramic enterprises has caused heavy pollution to the atmospheric environment. The active coke-based flue gas desulfurization and denitrification technology not only can remove $SO_2$ and $NO_x$ in the flue gas at the same time, but also has advantages such as no water consumption, no secondary pollution, effective removal of contaminants such as dust and heavy metals (e.g. mercury) in the flue gas, and recovery and regeneration of sulfur resources by an adsorbent. The removal effect of the active coke-based flue gas desulfurization and denitrification technology is influenced by the internal structure of the reactor. Accordingly, the design of the reactor from the overall structure to the internal flow field uniformization device is a key that cannot be ignored.

There exist two types of flue gas desulfurization and denitrification towers. The first type of flue gas desulfurization and denitrification tower comprises a tower body and a gas inlet arranged at the bottom and a gas outlet arranged at the top, and the interior of the tower body is divided into upper and lower sections for desulfurization and denitrification respectively. An active coke feeder is arranged at the top of the tower body, and a first gas distribution device is arranged at the gas inlet of the tower body, and an ammonia spraying device and a second gas distribution device are arranged in the middle of the tower body. The active coke moves slowly from the top to the bottom, and the flue gas enters from the bottom inlet, passes through the gas distribution device for the adjustment of the flow velocity and pressure distribution in the tower, through the ammonia spraying zone to mix with the aqueous ammonia, and then through the second gas distribution device for the uniform mixing of the flue gas with the ammonia gas, thereby to complete the desulfurization and denitrification process. The second type of flue gas desulfurization and denitrification tower comprises a tower body and a gas inlet arranged at the bottom and a gas outlet arranged at the top, adopting integrated desulfurization and denitrification. Wherein an ammonia spraying device is arranged at the inlet, and an adsorbent flow uniformization device is arranged inside the tower body along the length of the tower body, and a gas distribution plate is arranged in a place where the adsorbent flow uniformization device is connected with the gas inlet. The flue gas and the ammonia gas are mixed in the inlet zone, and pass through the gas distribution plate to enter the adsorbent flow uniformization device wherein the active coke flows uniformly inside, thereby achieving the purpose of simultaneous desulfurization and denitrification.

The above two types of flue gas desulfurization and denitrification towers all involve flue gas uniformization devices. However, there is a lack of more optimized design of the shape, size and position of the flue gas uniformization device to make the distribution of the flue gas flow field more uniform. Therefore, it is urgent to provide a novel flue gas purification tower herein to solve the above problems.

SUMMARY

The present invention aims to provide a flue gas purification tower capable of uniformly distributing the flue gas flow field inside the tower and improving the adsorption efficiency of the flue gas in the coke layer.

For the purpose, the present invention adopts the following technical solutions:

A flue gas purification tower, comprising a tower body, at least one gas inlet disposed at the bottom of the tower body, at least one gas outlet disposed at the top of the tower body, at least one active coke layer located inside the tower body, and a baffle plate arranged in a place where the flow direction of the flue gas from the gas inlet changes.

Further, the baffle plate is a straight plate, an arched plate, a straight-arched plate or a straight-arched-straight plate, wherein the straight-arched plate comprises a straight segment and an arched segment connected with each other; and the straight-arched-straight plate comprises a straight segment in the vertical direction, a straight segment in the horizontal direction, and an arched segment connected between the two straight segments.

As a preferred embodiment of the present invention, all the arched plate, the arched segment of the straight-arched plate and the arched segment of the straight-arched-straight plate have a radius between 1 m and 3 m.

As a preferred embodiment of the present invention, the baffle plate is formed with a plurality of circular holes or elongated holes.

As a preferred embodiment of the present invention, the number of the baffle plate is 3-5.

As a preferred embodiment of the present invention, the baffle plate has the same length as the gas inlet and a height between 1 m and 3 m.

As a preferred embodiment of the present invention, the active coke layer has a thickness between 1.4 m and 1.9 m.

As a preferred embodiment of the present invention, the tower body has a length between 6 m and 10 m, a width between 6 m and 10 m and a height between 20 m and 40 m.

The present invention has following advantageous effects:

The flue gas purification tower of the present invention is arranged with a baffle plate in a place where the flow direction of the flue gas from the gas inlet changes, which baffle plate can be a straight plate, an arched plate, a straight-arched plate or a straight-arched-straight plate. By selecting reasonable type, size and arrangement mode of the baffle, the uniform distribution of the flue gas at the gas inlet is improved, thereby the adsorption efficiency of the flue gas in the coke layer is improved.

REFERENCE SIGNS 1, gas inlet; 2, gas outlet; 3, active coke layer; 4, baffle plates.

DETAILED DESCRIPTION

The technical solutions of the present invention are further illustrated by the specific embodiments below.

Preferred Embodiment

Figure 1:
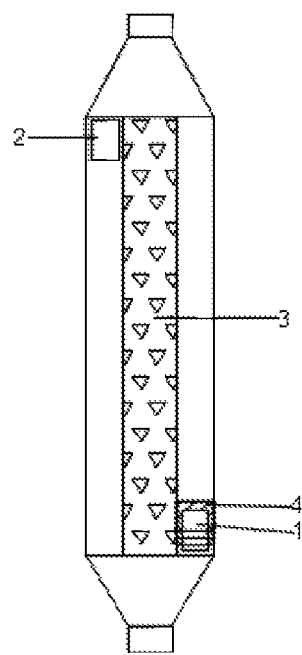
FIG. 1 is a first schematic structural diagram of a flue gas purification tower provided by a preferred embodiment of the present invention.
Figure 2:
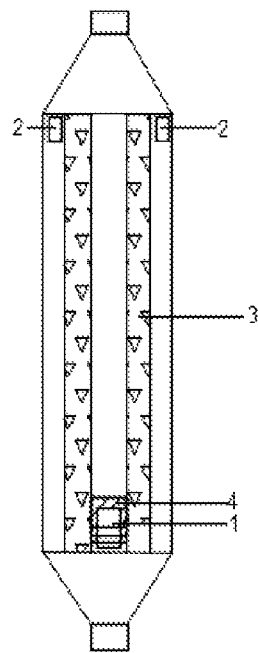
FIG. 2 is a second schematic structural diagram of a flue gas purification tower provided by a preferred embodiment of the present invention.

Disclosed in this preferred embodiment is a flue gas purification tower, which is mainly designed for desulfurization and denitrification of a flue gas by an active coke method. The flue gas purification tower comprises a tower body, at least one gas inlet 1 disposed at the bottom of the tower body, at least one gas outlet 2 disposed at the top of the tower body, at least one active coke layer 3 located inside the tower body, and baffle plates 4 arranged in a place where the flow direction of the flue gas from the gas inlet 1 changes, wherein the flue gas at the gas inlet 1 flows parallel to the active coke layer 3, as shown in FIG. 1 and FIG. 2.

Figure 3:
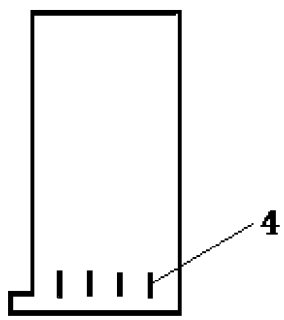
FIG. 3 is a first schematic structural diagram of baffle plates in a flue gas purification tower provided by a preferred embodiment of the present invention.
Figure 4:
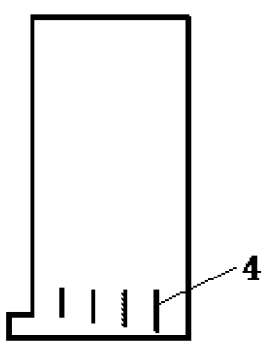
FIG. 4 is a second schematic structural diagram of baffle plates in a flue gas purification tower provided by a preferred embodiment of the present invention.
Figure 5:
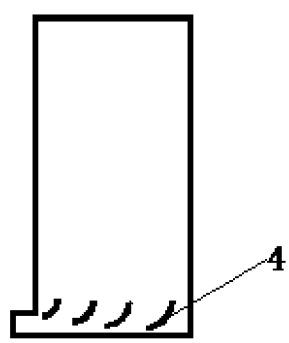
FIG. 5 is a third schematic structural diagram of baffle plates in a flue gas purification tower provided by a preferred embodiment of the present invention.
Figure 6:
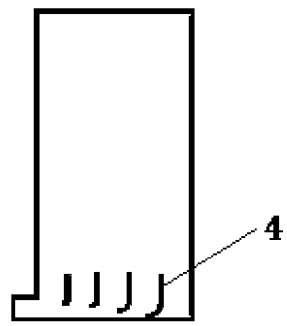
FIG. 6 is a fourth schematic structural diagram of baffle plates in a flue gas purification tower provided by a preferred embodiment of the present invention.
Figure 7:
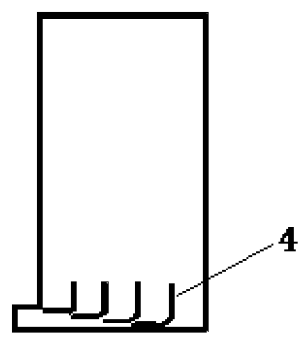
FIG. 7 is a fifth schematic structural diagram of baffle plates in a flue gas purification tower provided by a preferred embodiment of the present invention.
Figure 8:
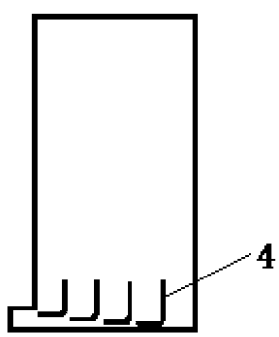
FIG. 8 is a sixth schematic structural diagram of baffle plates in a flue gas purification tower provided by a preferred embodiment of the present invention.

As shown in FIG. 3 and FIG. 4, the baffle plates 4 are straight plates, wherein the baffle plates 4 in FIG. 4 are arranged in a stepped manner. As shown in FIG. 5, the baffle plates 4 are arched plates with radii between 1 m and 3 m. As shown in FIG. 6, the baffle plates 4 are straight-arched plates, wherein each straight-arched plate comprises a straight segment and an arched segment with a radius between 1 m and 3 m connected with each other. As shown in FIG. 7 and FIG. 8, the baffle plates 4 are straight-arched-straight plates, wherein each straight-arched-straight plate comprises a straight segment in the vertical direction, a straight segment in the horizontal direction, and an arched segment with a radius between 1 m and 3 m connected between the two straight segments. The radii of the arched segments in FIG. 7 are sequentially increased, and the radii of the arched segments in FIG. 8 are the same.

The tower body has a length between 6 m and 10 m, a width between 6 m and 10 m and a height between 20 m and 40 m; and the active coke layer has a thickness between 1.4 m and 1.9 m, preferably 1.5 m.

The baffle plates 4 are formed with a plurality of circular holes or elongated holes, which can enhance the local turbulence effect, and can make a mixed gas more uniform when delivering the mixed gas. The number of the baffle plates 4 is 3-5. The baffle plates 4 have the same length as the gas inlet 1, so as to prevent the gas from flowing along the edge to cause significant turbulence. And the baffle plates 4 have a height between 1 m and 3 m, which is adjusted according to the size of the tower body. As for the arrangement position of the baffle plates 4, it is generally considered to uniformly distribute the baffle plates 4 in a place where the flow direction of the flue gas from the gas inlet 1 changes according to the number, and then finely adjust according to the result of the flow distribution uniformity.

In order to better explain the present embodiment, two examples are as follows:

As shown in FIG. 1, the flue gas purification tower comprises a tower body with a length of 8 m, a width of 8 m and a height of 30 m, one active coke layer 3 inside the tower body, a gas inlet 1 disposed at the bottom, a circular pipe with a diameter of 1 m as a gas inlet pipe, and a gas outlet 2 disposed at the top. The internal flow field distribution of the flue gas desulfurization and denitrification tower is simulated and optimized according to a software, and compared with the results of the flue gas flow field in the actual production process. Finally, the baffle plates 4 are selected as straight plates, arranged in a place where the flow direction of the flue gas from the gas inlet 1 changes and are in a stepped arrangement, so that the flow field can be optimized better, as shown in FIG. 4. Four baffle plates 4 are arranged at equal intervals of 1.5 m, and the distance between the first baffle plate 4 and one side wall of the tower is 2 m, while the distance between the fourth baffle plate 4 and the opposite side wall of the tower body is 1.5 m. The height of the baffle plates 4 is 2.5 m, and the distances from each of the baffle plates 4 to the bottom are increased by 0.2 m from the back to the front.

As shown in FIG. 2, the flue gas purification tower comprises a tower body with a length of 8 m, a width of 8 m and a height of 30 m, two opposite active coke layers 3 arranged inside the tower body, one gas inlet 1 disposed at the bottom, a gas inlet pipe having a rectangular nozzle with a length of 2 m and a width of 1.5 m, and two opposite gas outlets 2 disposed at the top. The flow of the flue gas is set at 150,000 $Nm^3/h$, the internal flow field distribution of the flue gas desulfurization and denitrification tower is simulated and optimized according to a software, and compared with the results of the flue gas flow field in the actual production process. Finally, the baffle plates 4 are selected as straight-arched-straight plates, as shown in FIG. 8. Four baffle plates 4 are arranged in a place where the flow direction of the flue gas from the gas inlet 1 changes, wherein the straight segments in the vertical direction have a length of 0.5 m, 0.9 m, 1.3 m, and 1.7 m respectively from the front to the back, the straight segments in the horizontal direction have a length of 1 m, and the arched segments have a radius of 0.4 m. The distance between the first baffle plate 4 and one side wall of the tower body is 1.4 m, and the distances between the adjacent baffle plates 4 are successively 1.5 m, 1.5 m and 1.6 m from the front to the back, while the distance between the fourth baffle plate 4 and the opposite side wall of the tower body is 2 m, and the distances from each of the baffles 4 to the bottom are increased by 0.2 m from the back to the front.

The flue gas purification tower provided by this embodiment is arranged with baffle plates in a place where the flow direction of the flue gas from the gas inlet changes, which baffle plates can be a straight plate, an arched plate, a straight-arched plate or a straight-arched-straight plate. By selecting reasonable type, size and arrangement mode of the baffle plates, the uniform distribution of the flue gas at the gas inlet is improved, thereby the adsorption efficiency of the flue gas in the coke layer is improved.

Finally, it should be further illustrated that the term "comprise(s)", "comprising" or any other variants thereof is intended to encompass a non-exclusive inclusion, so that a process, method, article or device that comprises a set of elements comprises not only those elements, but also other elements not explicitly listed, or further comprises the elements that are inherent to such a process, method, article or device. When there are no more restrictions, an element that is defined by the phrase "comprise(s)/comprising a . . . " does not exclude the presence of additional equivalent elements in the process, method, article or device that comprises said element.

The examples described above with reference to the accompanying drawings are merely preferred technical solutions of the present invention, and are not intended to be limiting, and any modifications of the specific embodiments of the present invention or equivalents of some of the technical features without departing from the spirit of the present invention should be included in the protection scope claimed by the present invention. The protection scope of the present invention also includes any alternative technical solutions that can be conceived by those skilled in the art without any inventive labor.

What is claimed is:

1. A flue gas purification tower, comprising a tower body, at least one gas inlet disposed at the bottom of the tower body, at least one gas outlet disposed at the top of the tower body, at least one active coke layer located inside the tower body, and a baffle plate arranged in a place where the flow direction of the flue gas from the gas inlet changes, wherein the baffle plate is formed with a plurality of circular holes or elongated holes.

2. The flue gas purification tower according to claim 1, wherein the baffle plate is a straight plate, an arched plate, a straight-arched plate or a straight-arched-straight plate, wherein the straight-arched plate comprises a straight segment and an arched segment connected with each other; and the straight-arched-straight plate comprises a straight segment in the vertical direction, a straight segment in the horizontal direction, and an arched segment connected between the two straight segments.

3. The flue gas purification tower according to claim 2, wherein all the arched plate, the arched segment of the straight-arched plate and the arched segment of the straight-arched-straight plate have a radius between 1 m and 3 m.

4. The flue gas purification tower according to claim 1, wherein the number of the baffle plate is 3-5.

5. The flue gas purification tower according to claim 1, wherein the baffle plate has the same length as the gas inlet and a height between 1 m and 3 m.

6. The flue gas purification tower according to claim 1, wherein the active coke layer has a thickness between 1.4 m and 1.9 m.

7. The flue gas purification tower according to claim 1, wherein the tower body has a length between 6 m and 10 m, a width between 6 m and 10 m and a height between 20 m and 40 m.

* * * * *